2 Sheets--Sheet 1.

E. BUSSEY.

Cooking-Stoves.

No. 5,880. Reissued May 19, 1874.

WITNESSES:

Jas. E. Hutchinson

John R. Young

INVENTOR.

Esek Bussey, by

Prindle and Dean, his

Attorneys

A.M. PHOTO-LITHOGRAPHIC Co. N.Y. (OSBORNE'S PROCESS.)

2 Sheets--Sheet 2.

E. BUSSEY.

Cooking-Stoves.

No. 5,880. Reissued May 19, 1874.

WITNESSES:

Jas. E. Hutchinson

John R. Young

INVENTOR.

Esek Bussey, by

Prindle and Brown his Attorneys

AM. PHOTO-LITHOGRAPHIC CO. N. Y. (OSBORNE'S PROCESS.)

UNITED STATES PATENT OFFICE.

ESEK BUSSEY, OF TROY, NEW YORK, ASSIGNOR OF ONE-HALF HIS RIGHT TO CHARLES A. McLEOD, OF SAME PLACE.

IMPROVEMENT IN COOKING-STOVES.

Specification forming part of Letters Patent No. 111,812, dated February 14, 1871; reissue No. 5,880, dated May 19, 1874; application filed April 21, 1874.

*To all whom it may concern:*

Be it known that I, ESEK BUSSEY, of Troy, in the county of Rensselaer and State of New York, did invent certain new and useful Improvements in Cooking-Stoves, for which Letters Patent No. 111,812 were issued to me upon the 14th day of February, 1871, which Letters Patent have been found defective in that the specification and claims do not cover and embrace all of the original invention and improvements as contained in the model and drawings filed in the United States Patent Office upon the 22d day of December, 1870. Now, therefore, being desirous to reissue said Letters Patent in the manner and form prescribed by law, I have prepared and do hereby declare that the following is a full, clear, and exact description of the said improvements, reference being had to the accompanying drawings making a part of this specification, in which—

Figure 1:
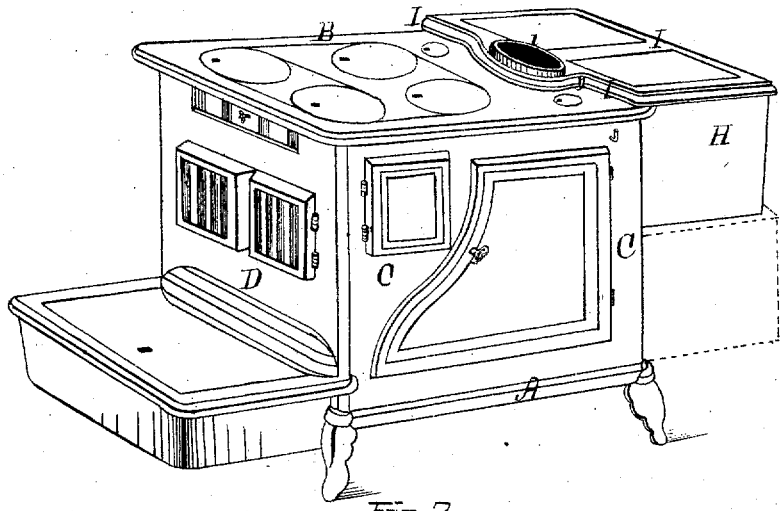
Figure 2:
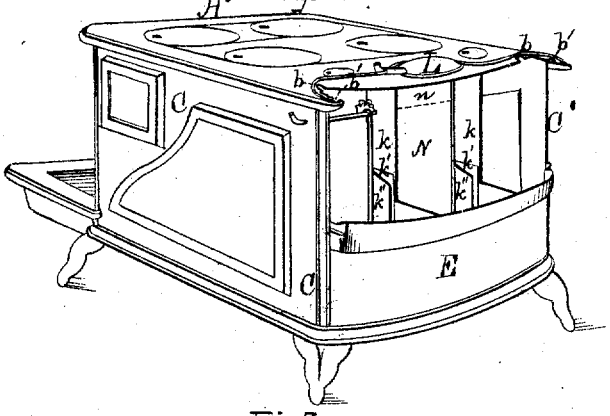
Figure 3:
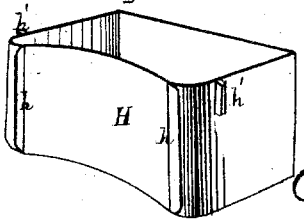
Figure 4:
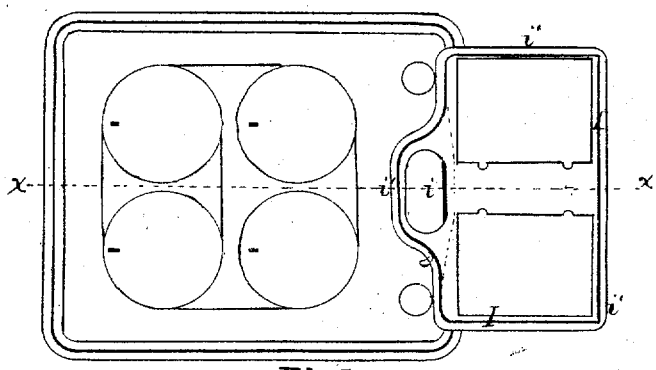
Figure 5:
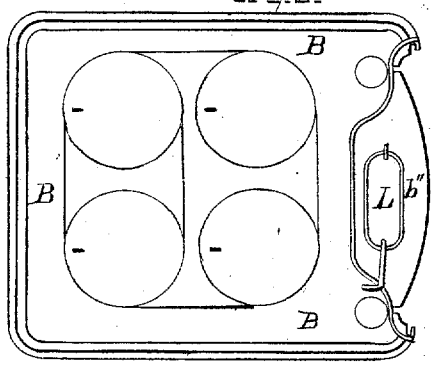
Figure 6:
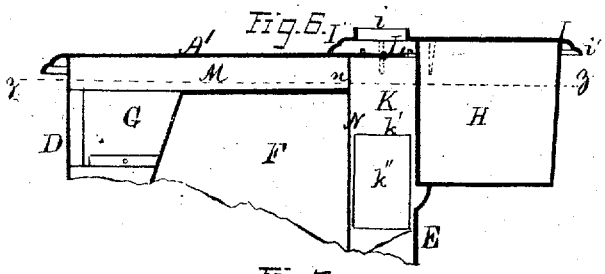
Figure 7:
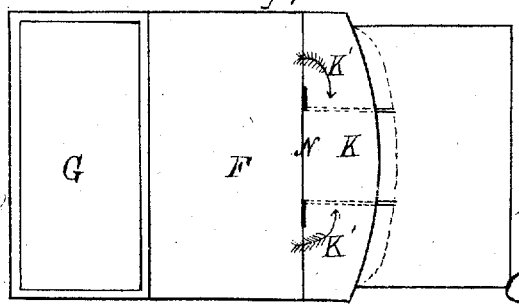

Figure 1 is a perspective view of a cooking-stove having connected therewith my improvements. Fig. 2 is a like view of the same from the rear, the water-reservoir being removed. Fig. 3 is a perspective view of said reservoir separated from said stove and having its covering-plate removed. Figs. 4 and 5 are plan views of the upper side of said stove, as shown in Figs. 1 and 2, respectively. Fig. 6 is a vertical section upon line *x x* of Fig. 4, and Fig. 7 is a horizontal section upon line *z z* of Fig. 6.

Letters of like name and kind refer to like parts in each of the figures.

Heretofore, in the manufacture of that class of cooking-stoves which have a water-reservoir located in rear thereof and partially or entirely below the top plate, it has been the general custom to secure such reservoir to or upon the rear end of the stove by means of bolts or rivets that passed through contiguous portions of the same. This method of attachment, while sufficient, has proved objectionable, in consequence of the difficulty experienced in the removal of the reservoir when required, such operation necessitating the displacement of the top plate of the stove, in order that access might be had to the fastening rivets or bolts. Another objection to this class of reservoir-stoves arises from the difficulty experienced in sufficiently heating the oven when the direct draft is employed, in consequence of the location within the reservoir of that portion of the ascending flue between the lower and upper sides of said reservoir, a portion of the latter being interposed between said flue and oven.

To obviate these and other difficulties is the design of my invention, which consists principally in attaching a water-reservoir to or upon the rear end of a cooking-stove by means of suitable lugs or projections which are formed upon said reservoir and engage with corresponding recesses or notches formed within the top plate of said stove, substantially as and for the purpose hereinafter specified. It consists, further, in an auxiliary top plate that is raised above the surface of the ordinary top plate of the stove, forms a covering for the upper side of said reservoir and the upper end of the center vertical flue, and is so arranged as to permit of the employment of a damper beneath said plate and within the upper end of said flue, substantially as and for the purpose hereinafter shown. It consists, further, in a damper placed below the said raised extended top plate and directly over the rear center flue, and combined with said parts, substantially as and for the purpose hereinafter set forth. It consists, finally, in dampered apertures placed in the vertical plate or plates which separate the rear descending flue or flues from the ascending flue of a cooking-stove, which stove has attached to its rear end a reservoir that forms a covering for a portion of the rear side of said ascending flue, substantially as and for the purpose hereinafter shown and described.

In the annexed drawings, A represents the bottom plate, B the top plate, C and C the side plates, D the front-end plate, and E the rear-end plate, of a stove, provided with an oven, F, fire-box G, and the usual system of flues. From the upper side of the stove to a point near its vertical center the rear-end plate E is removed, and within the opening thus formed is placed a water-reservoir, H, which corresponds to and closely fills the same, rests upon the upper end of said plate E, and is held in lateral position by means of four vertical lugs, *h* and *h'*, that are provided upon the front side and ends of said reservoir, near its upper side, and fit into corresponding notches *b* and *b'*, which are formed within the contiguous recessed rear end of the top plate B.

It will be seen that the weight of the reservoir is supported by and upon the upper end of the end plate F, which is preferably formed with a rearward and upward swell, while the engagement of the lugs *h* and *h'* insures the lateral position of said reservoir, and prevents displacement or removal of the same, except where sufficiently raised to withdraw said lugs longitudinally from their engaging notches. The upper side of the reservoir H, which is elevated above the top plate B, is inclosed by means of an auxiliary top plate, I, that closely fits over the same, and at its front side is extended forward over the upper end of an ascending flue, K, and at such point is provided with a pipe-collar, *i*, of usual form. An outward and downward projecting flange, *i'*, around the edge of the plate I, gives to the same a finished appearance, and also forms a bearing for said plate upon the top plate B. Within the top plate B, immediately over the center flue K, is provided an opening, *b''*, within which is pivoted an ordinary butterfly-damper, L, that takes the place of the damper usually placed within the pipe, and operates to check or regulate the draft; said damper, in consequence of the elevation of the auxiliary top plate I, having all necessary room in which to turn. Direct communication between the top oven-flue M and the center vertical flue K is cut off by means of a flue strip or plate, *n*, which forms a continuation of the back oven-plate N, so that the heated escaping products of combustion are compelled to pass downward through the diving-flues K' to a point near the lower side of the reservoir H, where an opening, *k'*, is provided within each vertical plate *k*, which separates said flues K and K'. Suitable dampers *k''* and *k''*, placed within the openings *k'* and *k'*, and arranged to be operated from without, enable said openings or passages to be closed at will, so as thereby to force the heated gases to pass into and through the bottom oven-flues before reaching and passing through the center flue K.

As thus arranged, by closing the dampers *k''* and *k''*, the heated escaping products of combustion take the usual course, and heat the oven in the ordinary manner, while the reservoir receives such heat as is necessary in order to keep its temperature at the required point. When the dampers *k''* and *k''* are opened, the heated gases pass from the descending flues K' and K' directly into the ascending flue K, where their heat is distributed equally to the front side of the reservoir, and the rear side of the oven, and, while more quickly heating the liquid contents of said reservoir than would otherwise be practicable, raise the temperature of said oven sufficiently high to permit of its use for many purposes.

The advantages obtained by my improvements are as follows: First, the auxiliary top plate furnishes a substantial, neat, and convenient covering for the upper side of the reservoir, and for the upper end of the rear center flue, and enables a check-draft damper to be successfully operated between said plate and the main top plate. Second, the means employed for attaching the reservoir to or upon the stove are simple, inexpensive, and enable said reservoir to be quickly removed from or replaced in position. Third, the employment of the damper within the upper end of the center vertical flue obviates the necessity for and is more convenient than a damper within the pipe. Fourth, the arrangement of the flues, water-reservoir, and dampered openings within the vertical flue-plates enables the direct draft to be employed with equal effect upon the water-reservoir, and with less injury to the heating capacity of the oven than has heretofore been practicable.

Having thus fully set forth the nature and merits of my invention, what I claim as new is—

1. The means employed for attaching the water-reservoir H to or upon the rear end of a cooking-stove, consisting of the lugs or projections *h* and *h'*, secured upon the ends and front side of said reservoir, and engaging with the corresponding notches *b* and *b'*, provided within the rear end of the top plate B, substantially as specified.

2. The auxiliary top plate I, combined with the main top plate B, reservoir H, and damper L, in the manner and for the purpose substantially as shown.

3. The damper L, located at the upper end of the rear center flue K and below the plane of the auxiliary top plate I, and combined with said parts in the manner and for the purpose substantially as set forth.

4. Dampered apertures *k'*, placed in the vertical plate or plates *k*, which separate the rear descending flue or flues K' from the ascending flue K of a cooking-stove, which stove has attached to its rear end a reservoir that forms a covering for a portion of the rear side of said ascending flue K, substantially as and for the purpose shown and described.

In testimony that I claim the foregoing I have hereunto set my hand this 16th day of April, 1874.

ESEK BUSSEY.

Witnesses:
CHAS. M. AUSTIN,
FREDERICK RATCLIFF.